United States Patent

Kanai et al.

Patent Number: 5,875,643
Date of Patent: Mar. 2, 1999

[54] REFRIGERATION CYCLE CAPACITY ENHANCEMENT APPARATUS

[75] Inventors: Hiroshi Kanai; Shunichi Furuya, both of Saitama Prefecture, Japan

[73] Assignee: Zexel Corporation, Tokyo, Japan

[21] Appl. No.: 27,883

[22] Filed: Feb. 20, 1998

[30] Foreign Application Priority Data

Feb. 24, 1997 [JP] Japan ..................................... 9-054276

[51] Int. Cl.⁶ .................................................... F25B 47/00
[52] U.S. Cl. ................................. 62/279; 62/285; 62/513
[58] Field of Search .............................. 62/272, 279, 285, 62/228, 513, 93

[56] References Cited

U.S. PATENT DOCUMENTS 2,632,303  3/1953  Smith ......................................... 62/285
4,313,315  2/1982  Calderoni et al. ......................... 62/513

Primary Examiner—John M. Sollecito
Attorney, Agent, or Firm—Ostrolenk, Faber, Gerb & Soffen, LLP

[57] ABSTRACT

Purpose

To provide a refrigeration cycle capacity enhancement apparatus that, in addition to lowering the temperature of coolant going from a condenser 4 to an evaporator 7, raising the temperature of coolant going from the evaporator 7 to a compressor 3, enhancing the performance thereof, and preventing the return of liquid coolant to the compressor 3, can also keep the pressure on the coolant from becoming higher and higher under high loading.

Constitution

Taking note of the fact that the capacity of a heat exchanger 5 is raised by combining drain water D from an evaporator 7 with the heat exchanger 5, this is a refrigeration cycle capacity enhancement apparatus that comprises a compressor 3 and a condenser 4 installed on the engine compartment 12 side of a vehicle, and an evaporator 7 installed on the vehicle cabin 13 side thereof. The heat exchanger 5 is provided to exchange heat between the coolant going from the condenser 4 toward the evaporator 7 and the coolant going from the evaporator 7 toward the compressor 3, while drain water D is conveyed to the heat exchanger 5 from the evaporator 7.

7 Claims, 2 Drawing Sheets

REFRIGERATION CYCLE CAPACITY ENHANCEMENT APPARATUS

BACKGROUND OF THE INVENTION

1. Field of the Invention

The present invention concerns a refrigeration cycle capacity enhancement apparatus, and particularly a refrigeration cycle capacity enhancement apparatus for applications in vehicle refrigeration cycles in which carbon dioxide gas is used as the coolant.

2. Description of the Related Art

In general, in a refrigeration cycle, a heat-exchanger is often provided for exchanging heat between low-pressure coolant at the outlet of an evaporator and high-pressure coolant at the intake of a condenser, thereby lowering the temperature of the coolant going from the condenser to the evaporator and raising the temperature of the coolant going from the evaporator to a compressor, enhancing the performance thereof, and seeking also to prevent the return of liquid coolant to the compressor.

In particular, in cases where carbon dioxide gas is used instead of conventional Freon as the coolant in the refrigeration cycle, Freon being problematic in that it destroys the ozone layer while carbon dioxide gas does not have that problem, a heat exchanger is well suited for enhancing the capacity of the refrigeration cycle, as noted above.

As to the heat exchanger, a double-pipe structure is effective, irrespective of the coolant type.

This heat exchanger will take on the functions of the condenser in an auxiliary capacity, so it is effective in lowering the high pressure of the coolant to some degree. However, when there is a high load on the refrigeration cycle, this is not adequate for circumventing high pressure rises in the coolant, which is a problem.

Meanwhile, there is another method for cooling high-pressure coolant in an auxiliary manner, namely that of introducing to the condenser the drain water from the evaporator that is discharged in abundance when there is a high load, as noted above, and exchanging heat between this and the coolant. However, there are problems with this also. Not only is the actual effective flow volume insufficient, with drain water alone, to cool the high-pressure coolant, but, particularly in refrigeration cycles used in vehicles, while the drain water is being conveyed to a condenser installed inside the engine compartment it absorbs heat from the engine compartment and evaporates, so that hardly any benefit can be hoped for.

SUMMARY OF THE INVENTION

With the problems noted in the forgoing in view, it is an object of the present invention to provide a refrigeration cycle capacity enhancement apparatus which is able to enhance performance by lowering the temperature of coolant going from a condenser to an evaporator.

Another object of the present invention is to provide a refrigeration cycle capacity enhancement apparatus which, in addition to enhancing performance by raising the temperature of coolant going from a condenser to a compressor, prevents the return of liquid coolant to the compressor.

Another object of the present invention is to provide a refrigeration cycle capacity enhancement apparatus that, when exchanging heat between drain water from an evaporator and coolant from a condenser, can effectively utilize the heat of cooling of the drain water.

Another object of the present invention is to provide a refrigeration cycle capacity enhancement apparatus that can control the high-pressurization of coolant pressures at times of high loading, etc.

The present invention, more specifically, reflecting the fact that attention has been given to raising the capacity of a heat exchanger by combining the heat exchanger with drain water from an evaporator, is a refrigeration cycle capacity enhancement apparatus for a refrigeration cycle comprising: a compressor and a condenser installed on the engine compartment side of a vehicle; an evaporator installed on the vehicle cabin side thereof; cycle capacity enhancement apparatus, comprising a heat exchanger for exchanging heat between coolant going from the condenser to the evaporator and coolant going from the evaporator to the compressor, drain water from the evaporator being directed to the heat exchanger.

The heat exchanger can be made in a three-pipe structure that passes the coolant going from the condenser to the evaporator, the coolant going from the evaporator to the compressor, and the drain water from the evaporator.

It is preferable that the heat exchanger be installed in the vicinity of an evaporator provided on the vehicle cabin side. Any method desired may be used to introduce the drain water to the heat exchanger.

In the refrigeration cycle capacity enhancement apparatus according to the present invention, a heat exchanger is provided for exchanging heat between high-pressure coolant going from the condenser to the evaporator and low-pressure coolant going from the evaporator to the compressor, and provision is made for conveying low-temperature drain water to the heat exchanger. Therefore, by augmenting the heat-exchange action on the high-pressure coolant and low-pressure coolant in the heat exchanger, and aiding this further, the temperature of coolant going from the condenser to the evaporator is lowered, while the temperature of coolant going from the evaporator to the compressor is raised, thereby enhancing the performance thereof. This can also prevent the return of liquid coolant to the compressor, thus avoiding problems such as liquid compression in the compressor.

In addition, even under conditions where high-pressurization of the coolant occurs readily, as at times of high loading, the volume of drain water discharged from the evaporator increases at such times, so that it is possible to promote a heat-exchange action in the heat exchanger, and to effectively cool the high-pressure coolant from the condenser.

Not only so, but this heat exchanger can be installed close to the evaporator, and not close to the condenser, so that there is no danger of complete evaporation before performing the cooling action.

The present invention may be applied to any desired coolant, moreover, although the action described in the foregoing is particularly effective in cases where carbon dioxide gas is used as the coolant. Thus it can contribute to making carbon dioxide gas refrigeration cycles practical.

DESCRIPTION OF THE PREFERRED EMBODIMENTS

Figure 1:
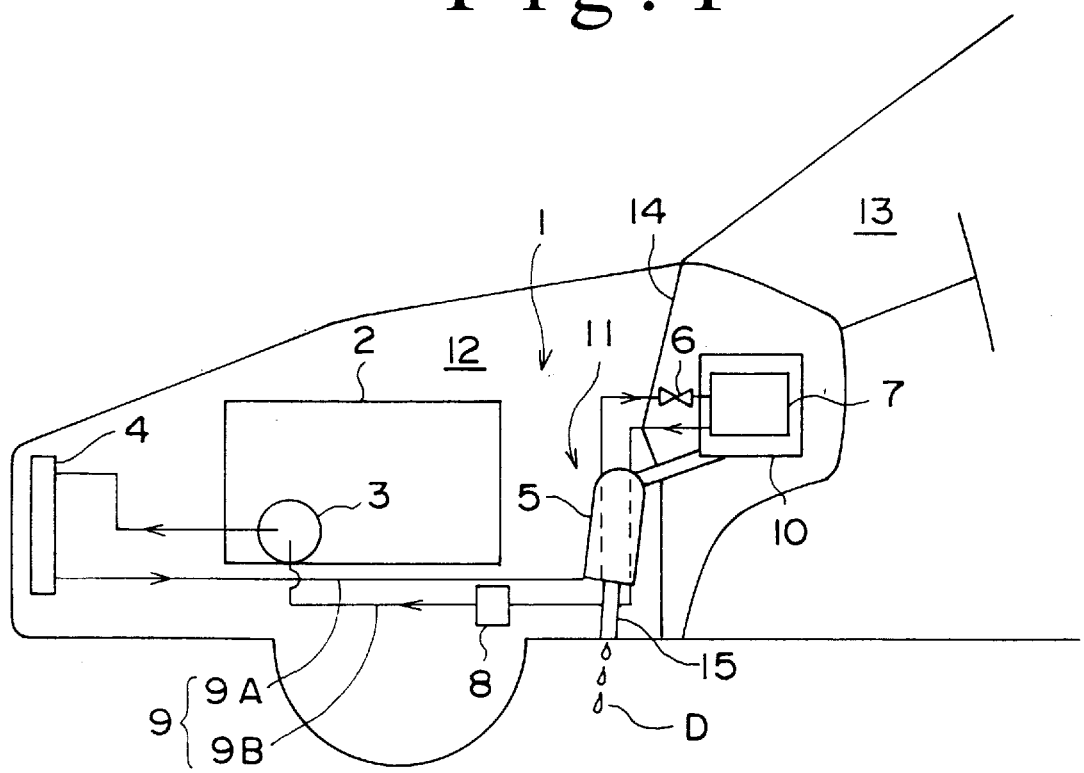
FIG. 1 is a simplified explanatory diagram of a refrigeration cycle 1 that is equipped with a refrigeration cycle capacity enhancement apparatus 11 based on a first embodiment of the present invention.
Figure 2:
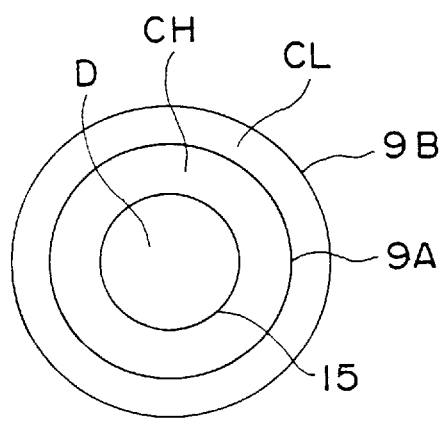
FIG. 2 is an enlarged partial cross-sectional view of part of a heat exchanger 5.

A description is next given, making reference to FIG. 1 and 2, of a refrigeration cycle 1 that is equipped with a refrigeration cycle capacity enhancement apparatus based on a first embodiment of the present invention, taking as an example a case where this is an application carried in a vehicle.

FIG. 1 is a simplified explanatory diagram of the refrigeration cycle 1. The refrigeration cycle 1, in addition to using carbon dioxide gas, for example, as the coolant, comprises a compressor 3 driven by an engine 2, a heat exchanger 5, an expansion valve 6, an evaporator 7, a vapor-liquid separator 8, a cycle pipeline 9 (high-pressure pipeline 9A and low-pressure pipeline 9B) connecting these, an evaporator housing 10, and a refrigeration cycle capacity enhancement apparatus 11.

The compressor 3 and condenser 4 are installed in an engine compartment 12. The engine compartment 12 and vehicle cabin 13 are compartmentalized by a barrier wall 14.

The evaporator 7 is installed inside an evaporator housing 10 in the vehicle cabin 13.

The refrigeration cycle capacity enhancement apparatus 11 basically comprises a heat exchanger 5. The heat exchanger 5 is installed on the engine compartment 12 side of the barrier wall 14, in a roughly perpendicular configuration.

FIG. 2 is a partial enlarged cross-sectional view of the heat exchanger 5. The heat exchanger 5 has a three-pipe structure comprising, from the outside in, a low-pressure pipeline 9B through which low-pressure coolant CL passes, a high-pressure pipeline 9A through which high-pressure coolant CH passes, and a drain pipe 15 from the evaporator 7 and evaporator housing 10.

The drain pipe 15 conveys drain water D collected at the bottom of the evaporator housing 10 to the heat exchanger 5 under the force of gravity.

As to the structure of the heat exchanger 5, this may be configured in the reverse order as that indicated in FIG. 2, that is, from the outside in, by the drain pipe 15, high-pressure pipeline 9A, and low-pressure pipeline 9B, just so long as either thermal contact between the low-pressure coolant and high-pressure coolant and thermal contact between the drain water D and the high-pressure coolant are implemented, or heat exchange is effected between these.

In a refrigeration cycle 1 or refrigeration cycle capacity enhancement apparatus 11 configured in this manner, the high-pressure coolant CH that passes from the condenser 4 through the high-pressure pipeline 9A toward the evaporator 7 exchanges heat, in part of the heat exchanger 5, with the low-pressure coolant CL that passes from the evaporator 7 through the low-pressure pipeline 9B toward the compressor 3, while also exchanging heat with the drain water D, because the drain water D from the evaporator 7 is conveyed to the heat exchanger 5 through the drain pipe 15. Thus can the heat-exchange action be promoted.

More specifically, at times of high temperature, with a temperature of 35° C. and relative humidity of 70% inside the vehicle cabin, the drain water D discharge volume is approximately 8 kg/h. By effectively using this, the capacity of a two-pipe heat exchanger having only a conventional high-pressure pipeline 9A and low-pressure pipeline 9B is improved by about 38%.

The greater the load on the refrigeration cycle 1, the more drain water D will be discharged. Therefore there is effectiveness in suppressing high coolant pressures during times of high loading.

Also, the heat exchanger 5 can be placed close to the evaporator 7, so that it can be made difficult for the drain water D to absorb heat from the engine compartment 12.

Further, since the heat exchanger 5 is installed in a roughly perpendicular configuration below the evaporator 7 and evaporator housing 10, the drain water D can descend naturally and pass through the drain pipe 15, so there is no need for an extra mechanism for moving the drain water D.

Compared to cases where the drain water D is conveyed directly to the condenser 4, as conventionally, moreover, the design location for the heat exchanger 5 may be freely selected, so the heat exchanger 5 is not readily affected by heat from the engine compartment 12.

Figure 3:
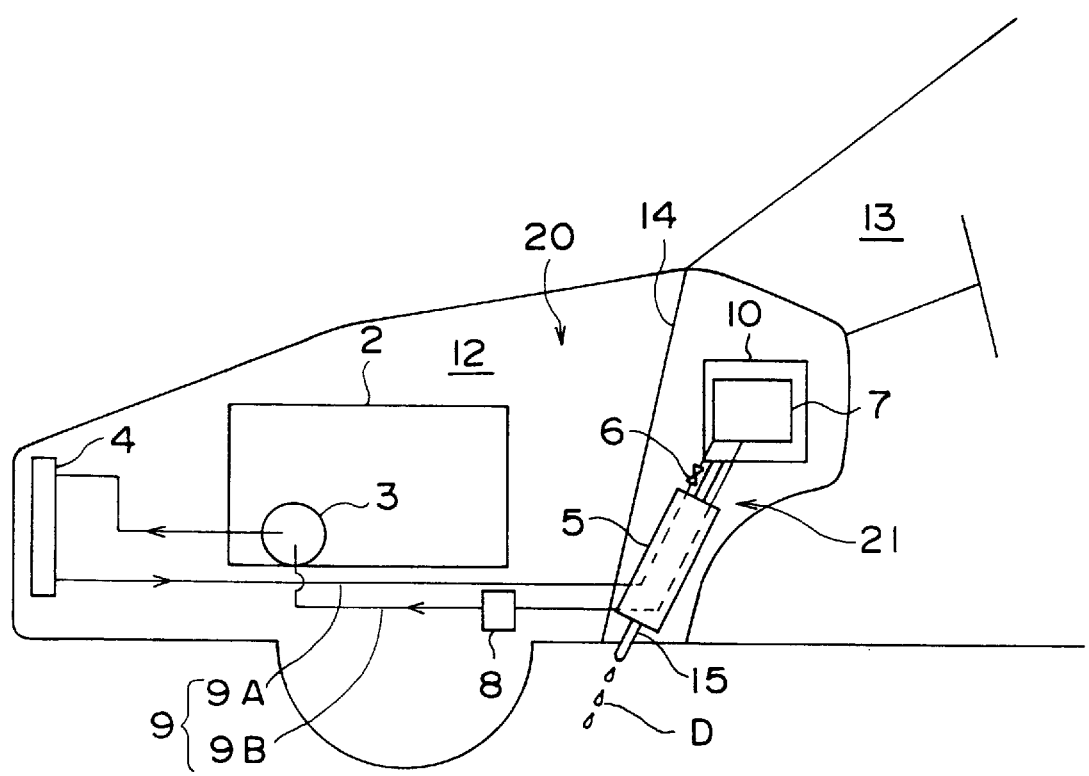
FIG. 3 is a simplified explanatory diagram of a refrigeration cycle 20 that is equipped with a refrigeration cycle capacity enhancement apparatus 21 based on a second embodiment of the present invention.

FIG. 3 is a simplified explanatory diagram for a refrigeration cycle 20 equipped with a refrigeration cycle capacity enhancement apparatus based on a second embodiment of the present invention. In the refrigeration cycle 20, the heat exchanger 5 described above is installed in a configuration that is slightly inclined from the vertical, along the vehicle cabin 13 side of the barrier wall 14, thereby configuring a refrigeration cycle capacity enhancement apparatus 21.

The rest of the configuration is in point of fact the same as in the refrigeration cycle capacity enhancement apparatus 11 (FIG. 1).

The degree of inclination in the heat exchanger 5 can be designed at will, depending on the drain water D discharge volume, coolant temperature and pressure, etc., so as to obtain the optimum heat-exchange efficiency.

In the refrigeration cycle 20 and refrigeration cycle capacity enhancement apparatus 21 configured in this manner, the heat-exchange action between the low-pressure coolant CL, high-pressure coolant CH, and drain water D is the same as for the cooling cycle 1 (cooling cycle capacity enhancement apparatus 11) described earlier, except that the heat exchanger 5 (refrigeration cycle capacity enhancement apparatus 21) is not inside the engine compartment 12, but rather inside the vehicle cabin 13. This makes it even more difficult for the heat of the engine compartment 12 to have an effect, and so can further enhance the efficiency of the heat exchanger 5. Hence, as based on the present invention, the configuration is made such that drain water is conveyed to the heat exchanger, and heat is exchanged between it and the coolant at the outlet of the condenser, so that the heat of cooling of the drain water is effectively utilized, making it possible to enhance capacity and prevent liquid coolant from returning to the compressor.

Accordingly, there is effectiveness in suppressing a high pressure rise in the coolant, especially during times of high loading.

What is claimed is:

1. A refrigeration cycle capacity enhancement apparatus for a refrigeration cycle comprising:

a compressor and a condenser installed on the engine compartment side of a vehicle;

an evaporator installed on the vehicle cabin side thereof;

cycle capacity enhancement apparatus, comprising a heat exchanger for exchanging heat between coolant going from said condenser to said evaporator and coolant going from said evaporator to said compressor; wherein drain water from said evaporator is directed to said heat exchanger.

2. The refrigeration cycle capacity enhancement apparatus according to claim 1, wherein carbon dioxide gas is used as said coolant.

3. The refrigeration cycle capacity enhancement apparatus according to claim 1, wherein said heat exchanger is installed in the vicinity of said evaporator.

4. The refrigeration cycle capacity enhancement apparatus according to claim 1, wherein said heat exchanger is fashioned in a three-pipe structure that passes said coolant going from said condenser toward said evaporator, said coolant going from said evaporator toward said compressor, and said drain water from said evaporator.

5. The refrigeration cycle capacity enhancement apparatus according to claim 1, wherein said heat exchanger is fashioned in a three-pipe structure that, from outside in, comprises: a low-pressure pipeline that passes low-pressure coolant; a high-pressure pipeline that passes high-pressure coolant; and a drain pipe from said evaporator.

6. The refrigeration cycle capacity enhancement apparatus according to claim 1, wherein said heat exchanger is installed in a roughly vertical configuration along said engine compartment side of a barrier wall positioned between said engine compartment and said vehicle cabin.

7. The refrigeration cycle capacity enhancement apparatus according to claim 1, wherein said heat exchanger is installed in a configuration that is slightly inclined from the vertical along said vehicle cabin compartment side of a barrier wall positioned between said engine compartment and said vehicle cabin.

\* \* \* \* \*